United States Patent
Sharp

(10) Patent No.: US 7,973,421 B2
(45) Date of Patent: Jul. 5, 2011

(54) JET ENGINE COMPRISING AN INTEGRATED ELECTRIC MOTOR/GENERATOR UNIT

(75) Inventor: John Sharp, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 617 days.

(21) Appl. No.: 12/066,621

(22) PCT Filed: Sep. 20, 2006

(86) PCT No.: PCT/DE2006/001662
§ 371 (c)(1), (2), (4) Date: Jul. 14, 2008

(87) PCT Pub. No.: WO2007/036202
PCT Pub. Date: Apr. 5, 2007

(65) Prior Publication Data
US 2008/0265580 A1    Oct. 30, 2008

(30) Foreign Application Priority Data
Sep. 28, 2005 (DE) .......................... 10 2005 046 208

(51) Int. Cl.
F02C 7/26 (2006.01)
H02K 7/00 (2006.01)
(52) U.S. Cl. ................................. 290/52; 60/791; 310/58
(58) Field of Classification Search ................ 290/40 R, 290/40 C, 52; 60/791, 668; 310/58
See application file for complete search history.

(56) References Cited

U.S. PATENT DOCUMENTS

| | | | |
|---|---|---|---|
| 2,853,638 A | 9/1958 | Bonnano et al. | |
| 5,053,662 A | 10/1991 | Richter | |
| 5,208,522 A | 5/1993 | Griepentrog et al. | |
| 5,376,827 A * | 12/1994 | Hines | 290/52 |
| 5,867,979 A * | 2/1999 | Newton et al. | 60/226.1 |
| 6,914,344 B2 * | 7/2005 | Franchet et al. | 290/52 |
| 7,484,354 B2 * | 2/2009 | Stretton | 60/226.1 |
| 7,571,045 B2 * | 8/2009 | Muramatsu et al. | 701/100 |
| 7,721,555 B2 * | 5/2010 | Sharp et al. | 60/802 |
| 7,745,950 B2 * | 6/2010 | Lueck | 290/52 |
| 2002/0122723 A1 | 9/2002 | Care et al. | |
| 2004/0070211 A1 | 4/2004 | Franchet et al. | |
| 2004/0123603 A1 | 7/2004 | Care et al. | |
| 2010/0143100 A1 * | 6/2010 | Sharp | 415/170.1 |

FOREIGN PATENT DOCUMENTS
WO    WO 2005/073519 A1    8/2005
* cited by examiner

Primary Examiner — Nicholas Ponomarenko
(74) Attorney, Agent, or Firm — Greer, Burns & Crain, Ltd.

(57) ABSTRACT

A jet engine, in particular for an aircraft, having a high-pressure compressor that is situated inside a compressor housing, the high-pressure compressor having blade elements that, through their rotational motion, compress air flowing into the high-pressure compressor via an intake channel, the high-pressure compressor having a plurality of compressor stages on which the blade elements are situated, and the jet engine also having an integrated electric motor/generator unit, wherein the motor/generator unit is situated in the rotational plane of the at least first compressor stage of the high-pressure compressor, and includes a stator that extends around the periphery of the compressor housing, as well as a runner that is formed by the blade elements of the at least first compressor stage, and that the motor/generator unit has an output power of 100 kVA to 150 kVA.

12 Claims, 1 Drawing Sheet

JET ENGINE COMPRISING AN INTEGRATED ELECTRIC MOTOR/GENERATOR UNIT

Figure 1:
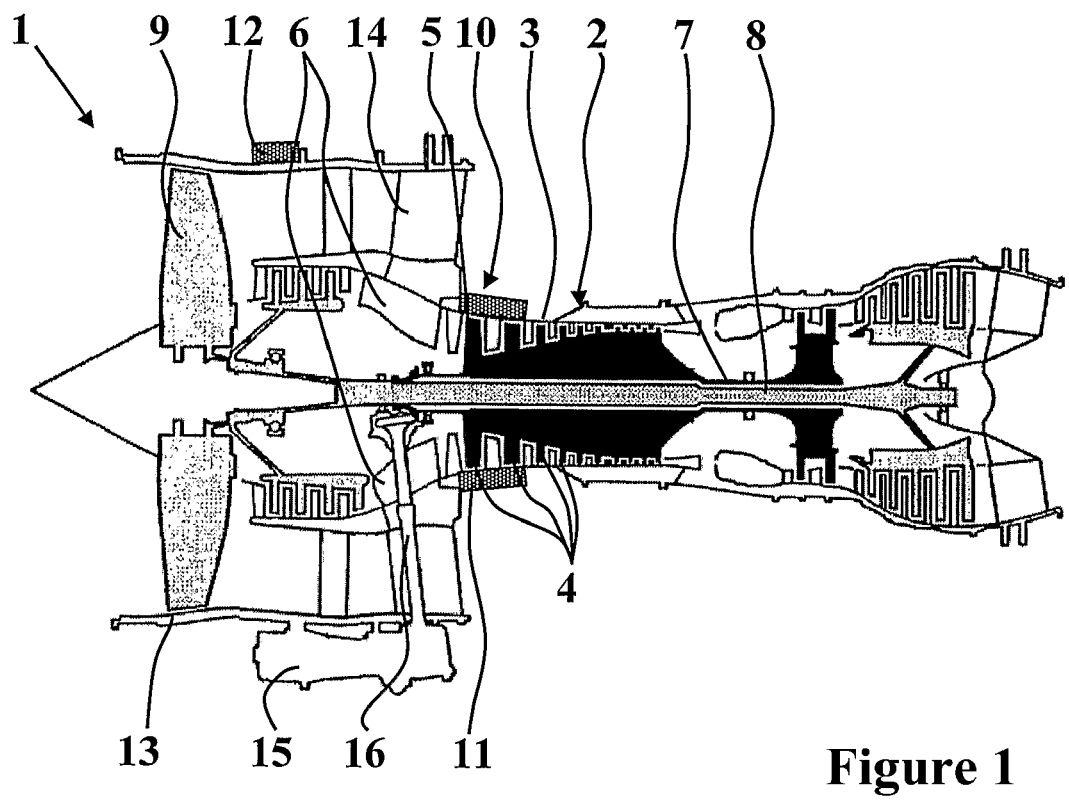

The present invention relates to a jet engine, in particular for an aircraft, having a high-pressure compressor that is rotatably mounted inside a compressor housing, the high-pressure compressor having blade elements that, through rotational motion, bring about a compression of air that flows into the high-pressure compressor via the intake channel, the high-pressure compressor having a plurality of compressor stages on which the blade elements are situated, and the jet engine also having an integrated electric motor/generator unit.

Jet engines of this sort are known, in which the means for starting the jet engine, as well as the means for producing electrical power, are situated separately from one another on the jet engine. To be started up, the jet engine must be mechanically started; in a two-shaft engine, the shaft of the high-pressure compressor is set into rotation via a mechanical engagement. In addition, jet engines have means for producing electrical power that can be situated in or on the jet engine in the form of a generator. The electrical power is required for the operation of various electrical devices of the aircraft; current developments show that the required electrical power of the aircraft continues to increase due to the increasing electrification of various aggregates. The jet engine under consideration in the present invention relates in particular to a fan engine that is fashioned as a two-shaft engine, the fan representing a low-pressure compressor that pre-compresses the air flowing into the engine, as well as producing a bypass flow around the hot exhaust gas jet or jetwash that is ejected centrically.

From US 2002/0122723 A1, a jet engine of the type described is known that has a generator that is integrated in the high-pressure compressor of the jet engine. The engine has compressor blades that are jacketed, and an electric generator is situated outside the jacketing. This generator consists of a stator comprising an electrical coil and a rotor that is connected to the engine shaft in such a way that this rotor equally executes a rotational motion. The rotor arrangement executes a rotational motion inside the stator, and induces an electrical voltage in the coil of the stator. The rotor elements are situated externally on the blade elements of the high-pressure compressor, and extend radially outward into the stator arrangement of the generator.

In the known generator system inside the jet engine, the problem occurs that the generator is situated inside the compressor housing of the high-pressure compressor. This increases the required diameter of the compressor housing, such that, due to the closed arrangement, the required maintenance is associated with a large expense due to the more difficult access to the generator. In addition, the electric motor, constructed as a generator, is not suitable for starting the jet engine, so that the start function has to be realized using what is called a gearbox, situated on the outside of the jet engine. The gearbox is connected to the high-pressure compressor shaft of the jet engine via a shaft connection, called a power shaft or a radial drive shaft. This shaft comprises a bevel gear connection in which a drive shaft that extends essentially perpendicular from the high-pressure compressor shaft drives the gearbox, and, via an angular gear mechanism, forms a drive train between the gearbox and the high-pressure compressor shaft of the jet engine. The gearbox can have both a starter function and also a generator function, such that this gearbox requires a significant amount of space around the periphery of the jet engine, has a high weight, and requires a high degree of maintenance. Another disadvantage is that the gearbox has means fashioned for the starting of the jet engine that during flight operation must be carried along as a device having no useful function, thus representing "dead weight."

Therefore, the object of the present invention is to create a jet engine in which means for starting the jet engine and for producing electrical power are provided that have a low maintenance requirement, are light in weight, and have a minimized space requirement.

This object is achieved on the basis of a jet engine according to the preamble of claim 1 in connection with the characterizing features thereof. Advantageous developments of the present invention are indicated in the dependent claims.

The present invention incorporates the technical teaching that the motor/generator unit is situated in the rotational plane of the at least first compressor stage of the high-pressure compressor, and comprises a stator that extends around the periphery of the compressor housing, as well as having a runner that is formed by the blade elements of the at least first compressor stage.

This solution offers the advantage that a simplified design of the motor/generator unit results that has smaller dimensions, and that, due to its efficiency, enables the unit to perform both a starter function for starting the jet engine and a generator function for generating electrical power for the aircraft. The stator of the motor/generator unit can be situated on the external periphery of a compressor housing, resulting in a significant improvement in accessibility for the purpose of maintenance, repair, or exchanging the stator. In addition, the stator of the motor/generator unit can be cooled by the bypass air flow of the low-pressure compressor, resulting in advantageous thermal characteristics. In addition, lower losses in the high-pressure compressor result, because it is not necessary to additionally provide an external cooling. The stator has a high diameter-length ratio, so that it extends around periphery of the housing of the high-pressure compressor. Here, the motor/generator unit can be situated both before the first compressor stage of the high-pressure compressor and also in the plane of the first compressor stage, as well as in the plane of the second or of an additional compressor stage.

The situation according to the present invention of the motor/generator unit can make available sufficient power to start the jet engine without additional electrical or mechanical means. Here, the motor/generator unit takes over a starter function of the jet engine. Due to the high output power of the motor/generator unit, the gearbox situated externally on the jet engine can either be made smaller in size or can be omitted. The high degree of available electrical power can be sufficient to replace the essential aggregates comprised by the gearbox with electrical components. These include for example hydraulic pumps, oil pressure pumps, or other devices situated in the gearbox.

Advantageously, the rotor components are omitted that are situated externally on the blade elements of the high-pressure compressor, because the runner of the motor/generator unit according to the present invention is formed by the blade elements themselves. The omission of the external rotor elements simplifies the design of the motor/generator unit, the runner being formed by the blade elements such that no additional maintenance is required besides standard maintenance.

A possible specific embodiment of the motor/generator unit provides that this unit is fashioned as a switched reluctance motor, and the at least first compressor stage forms the runner of the switched reluctance motor. A switched reluctance motor is distinguished in that a winding is provided only in the stator, and the runner has neither a winding, nor permanent magnets, nor a squirrel cage. Thus, advantageously, standard blade elements of a high-pressure compressor can be used for the operating principle of a reluctance motor without essential modification. The wiring of the stator is carried out according to a prespecified schema, requiring a control and power electronics system. The self-inductance of the stator coil is caused by a strongly grooved runner, formed by the blade elements situated on the at least first compressor stage. The runner is advantageously made of a material having a high magnetic flux density, this material preferably being an iron-cobalt alloy. These materials are particularly well-suited for building up magnetic fields. It can be provided that the blade elements have the named material properties only at their tips, or at least in the end area, the base element of the blade elements remaining unmodified due to the high demands made on strength and possibly on thermal properties, and not contributing, or not contributing significantly, to the formation of the runner of the motor/generator unit.

In another specific embodiment of the runner, it is provided that this runner has permanent magnets. Because the runner is formed by the blade elements of the high-pressure compressor, these blade elements preferably have permanent magnets at their ends, which can comprise a samarium-cobalt alloy. Here, the blade elements need not have the named magnetic properties throughout the entire element; rather, they can have these properties only at the tip of the blade elements. Thus, the blade elements can retain their mechanical properties, the magnetic property being sufficient if it is present as an additional function only, in the end area or external area of the blade elements. Alternatively, an edge ring can be situated externally around the blade elements, the edge ring having the corresponding magnetic properties, so that the blade elements themselves need not be modified even in the end area. The edge ring can have the properties of a permanent magnet due to the selected material, e.g. a samarium-cobalt alloy, and the blade elements can be made of a highly heat-resistant turbine material, e.g. Inconell. Alternatively to the formation of the covering band having a segmented permanent magnets, the covering band situated over the blade tip can also be fashioned only as a pure reinforcement for the blades, which are magnetic at least in the edge area. In this case, the covering band should be made of a magnetically permeable material.

Advantageously, the stator of the motor/generator unit is accommodated on or in the compressor housing, the housing having at least a slight magnetic permeability. Here it is sufficient for the compressor housing to have, at least in the area where the motor/generator unit is situated, a material that is magnetically transparent. This can be a light metal alloy; materials having high strength, such as a steel material with 6% Mn, 16% Ni, represent a possible advantageous alloy. It is also possible to use carbon fiber compound materials or compound materials having glass fibers or glass filament weaves. In the case in which the stator is integrated into the compressor housing, the electrical conductors can be embedded for example in the housing material, with insulation if necessary. In addition, the metallic materials of the stator can be incorporated in a manner analogous to a fiber reinforcement of the housing, further strengthening the housing structure. In addition, the accommodation of the stator in the compressor housing can also take place in that the housing is interrupted in the area of the stator and is completely replaced by the stator in that area.

In order to achieve a further increase in the integration density, it is proposed that a control and power electronics system be integrated in the motor/generator unit. This is required in particular for the wiring of a reluctance motor in order to enable control and regulation operation. Alternatively, the control and power electronics can be situated on and/or in the fan housing of the jet engine. This provides an electrical connection between the compressor housing on which the motor/generator unit is accommodated and the fan housing, and this connection can be routed past guide elements. The guide elements represent a mechanical connection between the fan housing, and thus create the possibility of arranging an electrical connection in the form of a cable guide. With respect to a possible cooling of the control and power electronics, situation in or on the fan housing can be advantageous, the advantageous accessibility further reducing possible maintenance expense. With regard to a possible power range of the motor/generator unit, this can be dimensioned such that an output power of approximately 100 kVA to 150 kVA can be produced. Such a power range makes it possible to operate at least the essential electrical or electromechanical components of an aircraft, such that an additional generator of the aircraft can be replaced. This can even be achieved in that the situation according to the present invention of the motor/generator unit can realize the entire electrical power supply of an aircraft. Depending on the type of aircraft, and on its size, it can be expected that, against the background of the possible power range of the motor/generator unit, the gearbox can be completely replaced, the omitted components of the gearbox being replaced by an electrical drive and a supplying of power taking place via the motor/generator unit. The various aggregates then need no longer be situated on the jet engine, but rather can advantageously be situated at various locations in the aircraft, due to their electrical realization. This provides the advantage that the gondola of the jet engine can be made smaller, so that improved aerodynamic properties can be achieved.

In addition, it is advantageous if the gap between the rotor tips and the stator is small, thereby achieving an optimization of efficiency. However, the gap must be large enough to prevent a collision between stator and rotor at all operating points.

Finally, an advantageous specific embodiment of the present invention provides that in the area of the stator the housing is as thin as it can be while meeting the mechanical and thermal requirements. In this way, an optimal housing design is achieved.

Additional measures that improve the present invention are indicated in the subclaims, and are explained in more detail below together with the description of a preferred exemplary embodiment of the present invention on the basis of the Figures.

Figure 2:
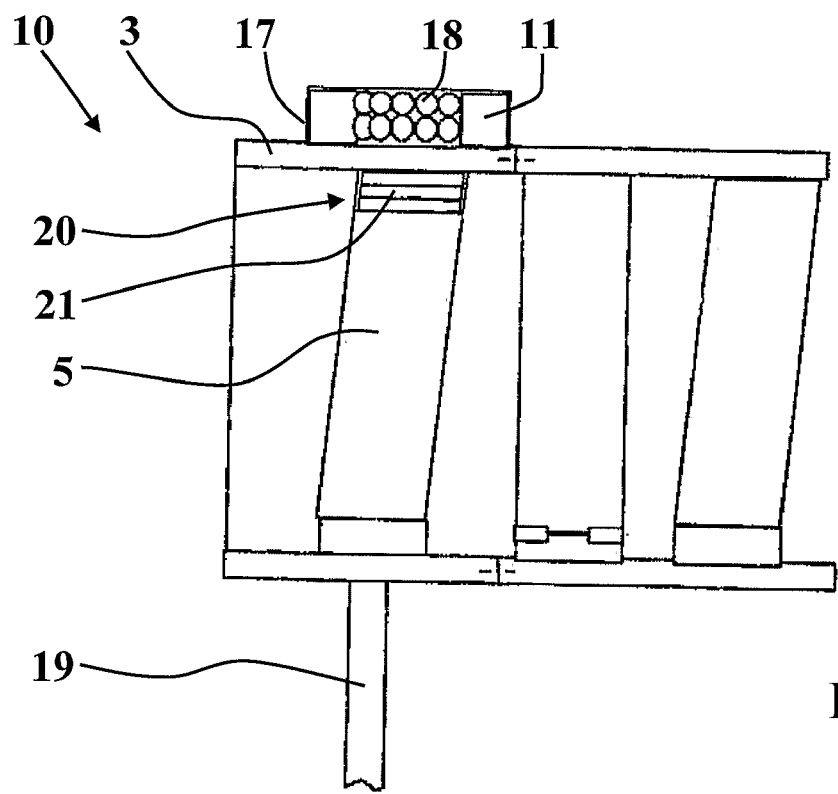

FIG. 1 shows a cross-section through a jet engine having a motor/generator unit that is situated in the rotational plane of the first compressor stage of the high-pressure compressor, and FIG. 2 shows a schematic representation of the situation of the motor/generator unit, a blade element of the high-pressure compressor being fashioned as a runner.

The Figures are schematic representations, intended only as examples.

Jet engine 1 shown in FIG. 1 has a high-pressure compressor 2 that comprises a compressor housing 3. In compressor housing 3, a plurality of compressor stages 4 are rotatably mounted, compressor stages 4 having blade elements 5 that compress air entering via an intake channel 6. The compression of the entering air takes place in stages one after the other using a multiplicity of compressor stages 4 that are successively situated in a parallel arrangement in the direction of flow of the air that is to be compressed. Compressor stages 4 are rotatably mounted on a hollow shaft 7, a low-pressure shaft 8 extending through hollow shaft 7. On low-pressure shaft 8, a fan 9 is rotatably mounted that, as a low-pressure stage, pre-compresses the entering air, and also produces a bypass flow around the inner flow area formed by high-pressure compressor 2.

In the front area of high-pressure compressor 2, at the level of first and second compressor stage 4 there is situated a motor/generator unit 10 that extends in annular fashion around the periphery of compressor housing 3. The part of motor/generator unit 10 situated externally on compressor housing 3 comprises a stator 11 that forms the stationary part of motor/generator unit 10. On the periphery of compressor stage 4, there are situated a multiplicity of blade elements 5 that execute a rotational motion in the plane of stator 11 of motor/generator unit 10 about the axis of hollow shaft 7. Thus, compressor stages 4 form with blade elements 5 the runner of motor/generator unit 10, these elements having magnetic properties and thus producing a voltage in a winding that is contained in stator 11. In order to control motor/generator unit 10, a control and power electronics system 12 is required that can be integrated in stator 11 of motor/generator unit 10, or, according to the present exemplary embodiment, can be situated on a fan housing 13. Between fan housing 13 and compressor housing 3 there are situated guide elements 14 on or in which an electrical connection between motor/generator unit 10 and control and power electronics system 12 can be routed.

On the lower side of jet engine 1, a gearbox 15 is shown that is mechanically connected to hollow shaft 7 via a drive train 16. Drive train 16 receives a rotational motion from hollow shaft 7 via a bevel gear toothing, and drives various aggregates that are situated in the gearbox; gearbox 15 can also contain a starter function for starting jet engine 1.

According to the exemplary embodiment of the present invention, a gearbox 15 and a drive train 16 are shown; this gearbox may be omitted, dependent on the possible electrical output power of the motor/generator unit 10 according to the present invention. The representation of gearbox 15 in FIG. 1 illustrates that if the gearbox is omitted, in addition to a significant weight reduction the housing of jet engine 1 can be made smaller and lighter, resulting in an improvement in the aerodynamic properties of the smaller engine gondola. In addition, the maintenance expense will be reduced, because the aggregates of the gearbox can be replaced by decentralized electrically operated aggregates. A starting of jet engine 1 using for example a pressurized air system supplied with power by the auxiliary power unit (APU) in the fuselage of the aircraft can also be omitted here, because motor/generator unit 10 can take over a starter function for jet engine 1 due to its power rating.

FIG. 2 shows a schematic representation of a motor/generator unit 10; in this Figure, only an upper half-section is shown. Stator 11 consists essentially of a stator housing 17 in which there is situated a winding 18 in which an electrical voltage is induced that forms the electrical output power. In addition, only one of a plurality of blade elements 5 is shown that is rotatably mounted on a rotor disk 19 (also called a spool) and that executes a rotational movement. In end area 20 of blade element 5, there is situated a permanent magnet 21, which can either be realized as a separate component or can be replaced by magnetic properties given to blade element 5 in end area 20. The rotation of permanent magnet 21, which executes a rotational movement together with blade element 5 on rotor disk 19, induces a voltage in winding 18 of stator 11, so that the output power can be picked off as a whole from motor/generator unit 10. Stator 11 is situated on compressor housing 3, which is made of a material having low magnetic permeability. Here, the segment of compressor housing 3 on which stator 11 is situated can comprise a material different from that of compressor housing 3 extending laterally to stator 11.

The realization of the present invention is not limited to the preferred exemplary embodiment indicated above. Rather, a number of variants are conceivable that also makes use of the described solution in fundamentally different realizations.

The invention claimed is:

1. A jet engine, in particular for an aircraft, comprising: a high-pressure compressor that is situated inside a compressor housing, the high-pressure compressor having blade elements that, through their rotational motion, compress air flowing into the high-pressure compressor via an intake channel, the high-pressure compressor having a plurality of compressor stages on which the blade elements are situated, and the jet engine also having an integrated electric motor/generator unit, wherein the motor/generator unit is situated in the rotational plane of the at least first compressor stage of the high-pressure compressor, and includes a stator that extends around the periphery of the compressor housing, as well as a runner that is formed by the blade elements of the at least first compressor stage, and that the motor/generator unit has an output power of 100 kVA to 150 kVA.

2. The jet engine as recited in claim 1, wherein the motor/generator unit is fashioned as a switched reluctance motor, and the at least first compressor stage forms the runner of the switched reluctance motor.

3. The jet engine as recited in claim 2, wherein the runner of the motor/generator unit is made of a material having a high magnetic flux density, preferably an iron-cobalt alloy.

4. The jet engine as recited in claim 1, wherein the runner of the motor/generator unit has permanent magnets.

5. The jet engine as recited in claim 4, wherein the permanent magnets of the runner of the motor/generator unit have a samarium-cobalt alloy.

6. The jet engine as recited in claim 1, wherein the blade elements of the at least one compressor stage have an outer segment that is distinguished by its magnetic properties.

7. The jet engine as recited in claim 1, wherein the stator of the motor/generator unit is accommodated on or in the compressor housing, the housing having at least a slight magnetic permeability.

8. The jet engine as recited in claim 1, wherein a control and power electronics system is integrated in the motor/generator unit.

9. The jet engine as recited in claim 8, wherein the jet engine has a fan housing, the control and power electronics system being situated on and/or in the fan housing.

10. The jet engine as recited in claim 9, wherein guide elements are situated between the compressor housing and the fan housing, and that an electrical connection between the motor/generator unit and the control and power electronics is situated in and/or on the guide elements.

11. The jet engine as recited in claim 1, wherein the gap between the rotor tip and the stator is minimal.

12. The jet engine as recited in claim 1, wherein the housing has a small thickness in the area of the stator.

* * * * *